United States Patent [19]
Jordan, Jr.

[11] Patent Number: 4,983,426
[45] Date of Patent: Jan. 8, 1991

[54] TIECOAT FOR USE WITH MASTIC COATING APPLICATIONS

[75] Inventor: Arthur D. Jordan, Jr., Penllyn, Pa.

[73] Assignee: Rohm and Haas Company, Philadelphia, Pa.

[21] Appl. No.: 262,369

[22] Filed: Oct. 24, 1988

[51] Int. Cl.$^5$ .......................... B05D 1/36; B05D 7/00
[52] U.S. Cl. .............................. 427/407.1; 524/432; 524/522
[58] Field of Search ................ 427/407.1; 524/432, 524/522

[56] References Cited

U.S. PATENT DOCUMENTS

| | | | |
|---|---|---|---|
| 2,901,453 | 8/1959 | Jordan | 524/219 |
| 3,266,925 | 8/1966 | Lovness | 428/144 |
| 3,620,810 | 11/1971 | Carter | 428/451 X |
| 4,291,086 | 9/1981 | Auten | 428/242 |
| 4,571,415 | 2/1986 | Jordan | 524/428 |
| 4,814,373 | 3/1989 | Frankel | 524/460 |

FOREIGN PATENT DOCUMENTS 258988 9/1986 European Pat. Off. .

*Primary Examiner*—Michael Lusignan

[57] ABSTRACT

A method for improving the quality of a mastic coating system by using a selected tiecoat composition. The tiecoat is applied to a substrate in order to correct substrate problems which would cause premature failure of a mastic coating applied directly to the substrate. The mastic coating is then applied to the tiecoat to yield a superior mastic coating system.

10 Claims, No Drawings

TIECOAT FOR USE WITH MASTIC COATING APPLICATIONS

FIELD OF THE INVENTION

This invention relates to water-based coatings for use as a coating or coatings, also known as tiecoats, disposed between a substrate and at least one subsequent other coating. More particularly, this invention is directed to a water-based tiecoat which provides improved properties to a mastic coating system when the tiecoat is disposed between a substrate and a mastic coating.

BACKGROUND OF THE INVENTION

Some coating applications require relatively thick films. For example, coatings to be applied to substrates such as, for example, foamed-in-place polyurethane foam, used to insulate and protect industrial building roofs, are conventionally on the order of 10–40 mils (0.02–0.10 cm.) thick. Such coatings are frequently referred to as "roof mastics" although "mastic coatings" as used herein includes any such thick coating applied to either a vertical surface such as, for example, a wall, or to a substantially horizontal surface such as, for example, a roof deck. In some cases, the substrates to which it is desired to apply mastic coatings present problems such as, for example, difficulty in adhesion due to a deteriorated substrate surface or the presence of highly colored bodies in or on the substrate which may migrate into and discolor the mastic coating. The tiecoats of this invention, disposed between the substrate and the mastic coating, solve such problems without unduly complicating or hindering the overall objective, the application of an effective mastic coating system.

DESCRIPTION OF THE PRIOR ART

U.S. Pat. No. 3,620,810 discloses a three layer waterproof roof coating with a first layer comprising gypsum, perlite, clay and other inorganic components, a second layer comprising a waterproof coating containing the components of the first layer with emulsified asphalt added thereto, and a top coating consisting of a polyvinylacetate emulsion and titanium dioxide.

U.S. Pat. No. 4,291,086 discloses a coating of high tensile strength and resilience for roofs and swimming pools comprising an asphalt underlayer, an intermediate layer of woven glass fabric, a first overlayer of acrylic emulsion bonded to the underlayer and intermediate layer and a second overlayer of acrylic resin emulsion bonded to the first overlayer. The coating is disclosed to minimize splitting, localized cracking, wrinkling and blistering and may provide stable cover of existing cracks and wrinkles, for example, on old roofs.

European Patent Application No. 258,988 discloses coating mastic or caulking compositions which have permanent low temperature flexibility and very low residual tack when cured. These compositions are applied as single layer coatings.

European Patent Application No. 187,505 discloses an aqueous dispersion which may be used as a coating composition for flexible and rigid substrates, or as a caulking composition or as a roof mastic composition which has reduced swelling in water and solvents and has reduced tack.

U.S. Pat. No. 3,266,925 discloses an oil-stain resistant roofing and siding sheet configuration in which light-weight oil fractions migrating from asphalt and bituminous substrates are prevented from staining decorative colored embedded granules by coating the granules with an anionic oleophobic fluorocarbon sizing agent. The incorporation of a cationic polyamine salt into the substrate layer adapted to react with the anionic fluorocarbon coating improves the adhesion between the fluorocarbon coated granules and the substrate layer.

U.S. Pat. No. 4,571,415 discloses water-based coatings and caulking compositions for exterior surfaces which upon application quickly develop resistance to being washed out by inadvertent precipitation. These compositions comprise an aqueous dispersion of water-insoluble latex polymer prepared by emulsion polymerization, inorganic pigment dispersed with anionic polymer, and water-soluble salt of a multivalent complex ion having labile, volatile ligands such as zinc ammonium complex ion. This invention is directed to compositions for exterior surfaces and does not disclose the use of these compositions as intermediate coats, or tiecoats.

U.S. Pat. No. 2,901,453 discloses aqueous coating compositions useful for the production of clear glossy non-blocking coatings on fibrous bases or substrates such as paper, paperboard, or the like. The composition may also be used as a release coating on a paper to be used as a liner in a concrete molding form or adapted to be used for covering freshly laid concrete roads. The compositions comprise (1) an ammonium salt of an approximately 1:1 mole ratio copolymer of maleamic acid and diisobutylene, the salt having an average molecular weight of about 500 to 5000, and (2) a water-insoluble linear addition polymer of certain composition with a modulus of rigidity transition temperature in the range of $-45$ C. to 30 C.; the amounts of (1) and (2) are from 10 to 35 parts of the former and 90 to 65 parts of the latter.

None of the references teach the use of a tiecoat disposed between a substrate and a mastic coating to solve problems which prevent the application of an effective mastic coating system.

It is, therefore, an object of this invention to provide a tiecoat disposed between a substrate and a mastic coating to provide an overall mastic coating system superior to that obtained by directly coating the substrate with the mastic coating.

It is an object of this invention to provide a method whereby a useful mastic coating can be applied, particularly over substrates with properties which could otherwise lead to premature failure of the mastic coating system if the mastic coating were applied directly over the substrate, through the use of an intermediate coat(s), or tiecoat, without unduly complicating or prolonging the application of the overall mastic coating system.

It is a further object of this invention to provide a method whereby an appropriate tiecoat disposed between a substrate and a mastic coating is applied to the substrate in order to solve problems such as, for example, stain bleedthrough in a mastic applied directly to the substrate or such as poor adhesion of a directly applied mastic coating to a deteriorated substrate, for example, without unduly complicating or lengthening the application of the overall mastic system.

SUMMARY OF THE INVENTION

A tiecoat composition is provided. When the tiecoat is disposed between a substrate and a mastic coating, a superior mastic coating system is achieved.

A method is provided wherein the quality of a mastic coating system is improved by the use of a tiecoat disposed between a substrate and a mastic coating.

DETAILED DESCRIPTION OF THE INVENTION

This invention is directed to the application of an aqueous intermediate coating, or tiecoat, as a step in the application of a mastic coating system to a substrate.

A mastic coating system is a relatively thick coating system, conventionally of a dried thickness of about 20 to about 40 mils (0.05 to 0.10 cm.) applied to interior or exterior substrates such as, for example, concrete block walls or built-up roofing formed from roofing felts and asphalt or tar. A substrate as used herein may be a newly formed or aged surface such as, for example, concrete, or it may comprise a first substrate surface freshly or previously treated or coated with at least one coating such as, for example, a re-tarred flat roof.

An aqueous coating is applied to the substrate prior to the application of at least one mastic coating. The aqueous coating, or tiecoat, used in the present invention comprises at least one water-insoluble latex polymer admixed with a detackifying agent.

The water-insoluble latex polymer is prepared by emulsion polymerization techniques well-known in the art. Any monomer mixture which yields a water-insoluble latex polymer with a glass transition temperature (Tg) from about −20° C. to about 0° C. may be used to prepare the latex polymers used in the tiecoat of this invention. For example, acrylic ester monomers including methyl acrylate, ethyl acrylate, butyl acrylate, 2-ethylhexyl acrylate, decyl acrylate, methyl methacrylate, ethyl methacrylate; acrylic acid, methacrylic acid, itaconic acid, maleic acid, fumaric acid, styrene, substituted styrenes, butadiene, acrylonitrile, vinyl acetate, and the like may be used. It is required that the monomer components of the latex polymer be selected such that the Tg of the dried latex polymer be from about −20° C. to about 0° C.

It is preferred that a low level of acid containing monomer such as, for example, from about −0.5% to about 5.0%, based on the weight of the latex monomer mixture, be incorporated into the latex polymer. Low levels of acid are beneficial to the stability of the latex polymer, but water resistance properties such as, for example, blister resistance are superior when minimum acid levels are incorporated into the latex polymer. It is especially preferred that from about 0.5% to about 1.0% of acid containing monomer based on the weight of the latex monomer mixture, be incorporated into the latex polymer.

Chain transfer agents including mercaptans, polymercaptans, and halogen compounds are sometimes desirable in the polymerization mixture in order to moderate the molecular weight of the latex polymer. Preferred chain transfer agents include, for example, $C_4$–$C_{20}$ alkyl mercaptans and mercaptopropionic acid and its esters. Generally, from about 0% to about 3%, by weight of such chain transfer agent on weight of the total monomer mixture, may be used.

Applications of the tiecoat may be made to various substrates such as, for example, asphaltic or bituminous surfaces, cement/asbestos shingles or roofing panels, urethane foam roofing panels, deteriorated concrete, and the like. The tiecoat may be applied by conventional techniques such as, for example, by brush, roller, airless spray, and the like.

Most embodiments of this invention require a detackifying agent. One such embodiment of this invention is a stain-blocking intermediate coat or tiecoat. In this embodiment a tiecoat is applied to a substrate such as, for example, a bituminous surface, prone to releasing colored bodies which would migrate into and discolor a mastic coating if it were directly applied to the substrate. The application of the tiecoat is an additional step in the application of the overall mastic coating system. It is essential that the tiecoat rapidly become low in tack so that the subsequent mastic coating can promptly be applied by operatives walking on the tiecoat thereby not unduly prolonging the overall application process. In this embodiment, a tack-reducing component is essential in the tiecoat In another embodiment of this invention a method is provided wherein a consolidating tie coat is applied to a substrate such as, for example, deteriorated cement/asbestos roofing panels, which would provide a surface, particularly if not ideally prepared, to which a mastic coating would exhibit inadequate adhesion and premature failure. A consolidating tie coat exhibits binding/penetrating properties such that any friable matter is sufficiently bound to the substrate surface and/or incorporated into the tiecoat that adequate adhesion of the mastic coating is realized. The application of any tiecoat is an additional step as hereinabove discussed and early "walkability" is essential to achieving a practical overall mastic system for horizontal surfaces. In this embodiment, a tack-reducing component is required in the tiecoat.

The tack-reducing component, or detackifying agent, may be particulate inorganic pigment such as, for example, zinc oxide; particulate polymeric pigment, such as, for example, an emulsion polymerization-prepared void-comprising pigment particle; or a hard alkali-soluble polymeric additive, such as, for example, the ammonium salt of maleamic acid/diisobutylene copolymer. The useful ranges of particulate inorganic pigment are from about 1% to about 10% by weight based on weight of dry latex polymer. The preferred range of particulate inorganic pigment is from about 3% to about 8% by weight based on weight of dry latex polymer. The useful range of particulate polymeric pigment is from about 10% to about 50% by weight based on weight of dry latex polymer. The preferred range of particulate polymeric pigment is from about 10% to about 40% by weight based on weight of dry latex polymer. The useful range of hard alkali-soluble polymeric additive is from about 1% to about 10% by weight based on weight of dry latex polymer. The preferred range of hard alkali-soluble polymeric additive is from about 3% to about 7% by weight based on weight of dry latex polymer.

Emulsion polymerization-prepared void-comprising organic pigment such as, for example, opacifying agent used in coating compositions, described in U.S. Pat. No. 4,427,836 and U.S. Pat. No. 4,468,498 incorporated herein by reference, may be used.

Hard alkali-soluble polymeric additives, such as, for example, the ammonium salt of maleamic acid/diisobutylene copolymer described in U.S. Pat. No. 2,901,453, incorporated herein by reference, may also be used. It is preferred that if these materials are used techniques which reduce residual monomers to low levels such as, for example, stripping, additional initiator chaser additions, hold periods, and additions of suitable chasing monomers such as, for example, styrenic monomers, be employed.

In addition, conventional coatings components such as, for example, pigments, dispersants, surfactants, coalescents, wetting agents, rheology modifiers, thickeners, drying retarders, biocides, anti-foaming agents, colorants, waxes, and the like, may be used in the tiecoat of this invention.

The following examples are intended to illustrate the method of using a tiecoat, to which this invention is directed. They are not intended to limit the invention as other applications of the invention will be obvious to those of ordinary skill in the art.

EXAMPLE 1. PREPARATION OF LATEX POLYMER

Preparation of Sample 1. To a 5 gallon stirred reactor 3532.5 g. of deionized water (DI water) was added and heated to 85° C. under nitrogen. At 85° C. a previously prepared mixture of 32.4 g. sodium persulfate in 135 g. DI water, 486 g. of a preform seed latex (41% solids, 65 nm. particle size), and 112.5 g. DI water was added. Immediately after this addition, both the monomer emulsion (Table 1.1) feed and a catalyst cofeed solution (10.8 g. sodium persulfate dissolved in 729 g. DI water) were started; the feeds were continued uniformly for 3 hours at 80°-83° C.. After the feeds were completed, 157.5 g. DI water was used to rinse out the monomer emulsion vessel, and the rinse was added to the reactor. The reaction mixture was held at 80° C. for 15 minutes. A neutralizer solution of 27 g. of ammonium hydroxide in 45 g. DI water was added and the reaction mixture was then cooled to 60° C. At 60° C. 1.35 g. of t-butyl hydroperoxide (70%) in 22.5 g. DI water and a solution of 1.44 g. of sodium sufoxylate formaldehyde in 40.5 g. DI water were added. Cooling was continued. After 15 minutes, at about 55° C., 1.35 g. of t-butyl hydroperoxide (70%) in 22.5 g. DI water and a solution of 1.44 g. of sodium sulfoxylate formaldehyde in 40.5 g. DI water were added. Cooling was continued. After 15 minutes, at about 50° C., 1.35 g. of t-butyl hydroperoxide (70%) in 22.5 g. DI water and a solution of 1.44 g. of sodium sulfoxylate formaldehyde in 40.5 g. DI water were added. A final dilution of 668 g. DI water was then added. The resultant latex had a solids content of 57.5% (55.5% theoretical), pH=4.8, Viscosity of 880 cps. (Brookfield viscosity #2 spindle at 60 rpm) particle size of 220 nm. (Nanosizer), and 0.02% gum.

TABLE 1.1

| Monomer Emulsion for Example 1. (all quantities in g.) | |
|---|---|
| DI water | 2205. |
| Dodecylbenzene sulfonate | 50.4 |
| Butyl acrylate | 6120.9 |
| Methyl methacrylate | 3356.6 |
| Glacial acrylic acid | 395.1 |

EXAMPLE 2. PREPARATION OF LATEX POLYMER

Preparation of Sample 2. To a 5 gallon stirred, cooled kettle was added 3819.5 g. DI water which was heated to 85° C.

When the kettle water reached 85° C., 5.3 g. sodium carbonate and 17.7 g. ammonium persulfate dissolved in 110.5 g. DI water were added. After waiting for 1 minute, 631.3 g. of a seed latex emulsion(45% solids, 100 nm particle size) was added and rinsed into the kettle with 125.5 g. DI water. Two minutes after the addition of the seed emulsion, the addition of the monomer emulsion (Table 2.1) and an initiator solution of 11.9 g. ammonium persulfate dissolved in 888.1 g. DI water was begun. The feeds were timed to run for three hours. Kettle cooling was regulated to maintain a temperature of 82°—82° C. during the polymerization. After a rinse of the monomer emulsion vessel of 137.5 g. DI water was added to the kettle the batch was held at 82°-83° C. for 30 minutes. A neutralizer of 11.9 g. of ammonia (28%) in 31.4 g. DI water was added. After 5 minutes, cooling was begun and 33. g. of a 0.15 wt. % solution of FeSO4.7H2O in DI water, 5. g. of a 1% solution of Versene in DI water, 1.0 g. t-butylhydroperoxide (70%) in 5 g. DI water, and 0.5 g. sodium sulfoxylate formaldehyde was added. Cooling was continued to a batch temperature of 60° C.. A solution of 1.0 g. t-butylhydroperoxide (70%) in 5. g. DI water and 0.5 g. sodium sulfoxylate formaldehyde in 15 g. DI water was added. After 15 minutes at 60° C. an additional 1.0 g. t-butylhydroperoxide (70%) in 5. g. DI water and 0.5 g. sodium sulfoxylate formaldehyde was added. The batch was then held at 60° C. for 30 minutes. After the hold period the batch was cooled to 45° C. and 265. g. DI water, the final neutralizer (66.35 g. aqua ammonia (28%) in 66.35 g. DI water), a solution of 32.5 g. benzophenone in 41.4 g. xylene, 2572.6 g. of 21% solids ammonium salt of maleamic acid/diisobutylene copolymer (Tamol ® 165), 48.6 g. of a bactericide (Proxel ® CRL; 10% solution), and a final dilution of 3323.6 g. DI water were added sequentially with stirring to allow good mixing between each addition. Cooling was continued to below 30° C. and the batch was filtered. The resultant latex had a total solids of 44.8% (theoretical solids was 45.02%); pH=9.4; viscosity of 35 cps. (Brookfield viscosity measured using #2 spindle at 30 rpm.), a particle size of 329 nm (measured by BI-90 light scattering), and a trace of gel on a 100 mesh filter screen.

TABLE 2.1

| Monomer Emulsion for Example 2 (all quantities in g.) | |
|---|---|
| DI water | 2740.9 |
| Sodium dodecylbenzene sulfonate | 46.9 |
| Butyl acrylate | 7061.3 |
| Methyl methacrylate | 3654.2 |
| Glacial methacrylic acid | 89.7 |

COMPARATIVE EXAMPLE 1. PREPARATION OF MASTIC COATING

Preparation of mastic coating 1. The following ingredients were combined and ground for 15 minutes on a high speed Cowles disperser.

| | |
|---|---|
| Water | 152.52 g. |
| Hydroxyethyl cellulose (Natrosol ® 250 MXR) | 4.37 g. |
| Anionic dispersant (30% T.S.) (Tamol ® 850) | 4.96 g. |
| Ethylene glycol | 25.4 g. |
| Defoamer (Nopco ® NXZ) | 1.98 g. |
| KTPP | 1.49 g. |
| Calcium carbonate (Duramite ®) | 422.72 g. |
| Titanium dioxide (TiPure ® R-960) | 70.37 g. |
| Zinc oxide (Kadox ® 515) | 46.95 g. |

The grind was let down at low speed with the following ingredients;

| | |
|---|---|
| Latex polymer (55% solids) (Rhoplex ® E-1791) | 470.59 g. |
| Texanol ® coalescent | 7.24 g. |
| Preservative (Skane ® M-8) | 1.00 g |
| Defoamer (Nopco ® NXZ) | 1.98 g |
| Aqueous Ammonia (28%) | 0.99 g |

COMPARATIVE EXAMPLE 2. PREPARATION OF MASTIC COATING 2

The following ingredients were combined and ground for 15 minutes on a high speed Cowles disperser.

| | |
|---|---|
| Water | 149.20 g. |
| Hydroxyethyl cellulose (Natrosol ® 250 MXR) | 4.10 g. |
| Anionic dispersant (30% T.S.) (Tamol ® 850) | 4.70 g. |
| Ethylene glycol | 23.8 g. |
| Defoamer (Nopco ® NXZ) | 2.85 g |
| KTPP | 1.40 g. |
| Alumina trihydrate (Alcoa C330) | 413.40 g. |
| Titanium dioxide (TiPure ® R-960) | 68.80 g. |
| Aqueous Ammonia (28%) | 0.90 g. |
| Zinc oxide (Kadox ® 515) | 45.90 g. |

The grind was let down at low speed with the following ingredients;

| | |
|---|---|
| Latex polymer (55% solids) (Rhoplex ® E-1791) | 460.20 g. |
| Texanol ® coalescent | 6.80 g. |
| Preservative (Skane ® M-8) | 1.00 g. |
| Defoamer (Nopco ® NXZ) | 2.85 g. |
| Aqueous ammonia (28%) | 0.90 g. |

EXAMPLE 3. EFFECT OF TIECOAT ON STAIN-BLOCKING

To plaques of Brai (U.S. Intec Corp.) APP (atactic polypropylene) modified bitumen a tiecoat was applied with a drawdown rod at 6–7 wet mils. After a 1 hour dry at ambient conditions, a mastic coating was applied with a Gardner knife at 20 wet mils. To other plaques of Brai a mastic coating was applied directly with a Gardner knife at 20 wet mils. After allowing each sample to dry for 24 hours under ambient conditions the samples were placed in either a 50° C. oven for two weeks or into an Atlas Weather-o-meter ® for 750 hours. At the completion of these treatments, the yellowness of the top surface of the mastic coating was measured with a Minolta CR-231 Colorimeter, direct reading to give b* values. On this scale, 0=absolute whiteness, 7–7.5=the threshhold of faint discoloration for most observers, and 30=light brown.

TABLE 3.1
Stain Blocking Results from Example 3

| Tie Coat | Mastic Coating | b* Value after 2 weeks/50° C. | b* Value after 750 hrs. WOM |
|---|---|---|---|
| None | mastic coating 1 | 18.83 | 10.43 |
| Sample 2 | mastic coating 1 | 6.06 | — |
| Sample 1 | mastic coating 1 | — | 8.83 |
| None | mastic coating 2 | 19.94 | — |
| Sample 2 | mastic coating 2 | 9.40 | — |

The tie coats of this invention reduced the yellowing apparent on the surface of the mastic coatings exposed to accelerated weathering conditions.

EXAMPLE 4. EFFECT OF TIE COAT ON STAIN BLOCKING

The procedures of Example 3 were repeated with the exception that a different substrate was used. In place of the Brai substrate of Example 3, plaques of APP modified bitumen (Genstar Corp.) were used.

TABLE 4.1
Stain Blocking Results from Example 4.

| Tie Coat | Mastic Coating | b* Value after 2 weeks at 50° C. |
|---|---|---|
| None | mastic coating 1 | 18.94 |
| Sample 2 | mastic coating 1 | 8.22 |
| None | mastic coating 2 | 19.23 |
| Sample 2 | mastic coating 2 | 11.38 |

The tie coats of this invention reduced the yellowing apparent on the surface of the mastic coatings exposed to oven treatment expected to simulate weathering conditions.

EXAMPLE 5. SURFACE TACK OF TIE COATS AND EFFECT OF DETACKIFYING AGENTS

Tack testing was conducted with tie coats applied to Brai (APP modified bitumen). Brai plaques were placed in direct sunlight. With a paint brush, a coating of tie coat was applied. The coating was allowed to dry for one hour. The surface temperature was measured with an infrared heat detector and the surface tack was determined by finger touch. In the case of tiecoats incorporating detackifying agents the following procedures were employed. Addition of the ammonium salt of maleamic acid/diisobutylene copolymer: Tamol ® 165 was added with stirring.

Addition of zinc oxide: the pH of the latex polymer was raised to about 10.0, water was mixed with Kadox ® 515 to make a slurry, and the slurry was added slowly with stirring. Addition of opaque polymer: void polymer was added with stirring.

TABLE 5.1
Surface Tack Results from Example 5

| Tiecoat | Surface Temperature (°F.) | Tiecoat Tack |
|---|---|---|
| Sample 1 | 135 | very poor |
| Sample 1/1% Tamol ® 165 | 135 | good |
| Sample 1/5% Tamol © 165 | 135 | excellent |
| Sample 1/10% Tamol © 165 | 135 | excellent |
| Sample 1/10% Void Polymer | 130 | poor |
| Sample 1/20% Void Polymer | 127 | good |
| Sample 1/40% Void Polymer | 115 | very good |
| Sample 1/1% ZnO | 135 | fair |
| Sample 1/3% ZnO | 135 | good |
| Sample 1/5% ZnO | 135 | excellent |

TABLE 5.1-continued

Surface Tack Results from Example 5

| Tiecoat | Surface Temperature (°F.) | Tiecoat Tack |
|---|---|---|
| Sample 1/10% ZnO | 135 | excellent |

NOTE:
Void polymer refers to the polymers of U.S. Pat. No. 4,427,836.

Good to excellent surface tack is obtained with the preferred tiecoats of the invention comprising detackifying agents. This permits the prompt coating of the tiecoat with a subsequent coating.

EXAMPLE 6. SURFACE TACK OF TIECOATS AND EFFECT OF DETACKIFYING AGENTS

Tack testing over hot mop asphalt was conducted. A piece of Type III asphalt was melted onto an aluminum panel. The coated panel was allowed to cool. The coated panel was then placed outdoors in the sun. A tiecoat was applied with a paint brush. The tiecoat was allowed to dry for one hour. The surface temperature was measured with an infrared heat detector and tack values were determined by finger touch.

TABLE 6.1

Surface tack results from Example 6

| Tiecoat | Surface (°F.) Temperature | Surface Tack |
|---|---|---|
| sample 1 | 175 | very poor |
| sample 1/5% Tamol ® 165 | 175 | excellent |
| sample 1/40% Void Polymer | 140 | very good |
| sample 1/5% ZnO | 175 | excellent |

Very good to excellent surface tack is obtained with the tiecoats of this invention comprising detackifying agents. This permits the prompt coating of the tiecoat with a subsequent mastic coating.

EXAMPLE 7. BLISTERING OF MASTIC SYSTEMS INCORPORATING TIECOATS

A tiecoat was applied over a substrate with a Gardner #60 drawdown rod at a wet film thickness of about 6 to 8 mils. The tiecoat was allowed to dry for about one hour. Mastic coating 1 was applied with a Gardner knife at a wet film thickness of about 20 mils. After 24 hours ambient drying, the sample was immersed in DI water for two weeks. The overall appearance was rated.

TABLE 7.1

Blistering Results from Example 7.

| Tiecoat | Substrate | Blistering Results |
|---|---|---|
| Sample 2 | Garlaply APP mod. bit. (Garland) | very good |
| Sample 2 | APP mod. bit. (Nord Bitumi) | good |
| Sample 2 | Brai APP mod. bit. (US Intec) | good |
| Sample 2 | APP mod. bit. (Genstar) | good |
| Sample 2 | Paradiene 20 SBS mod. bit. (Siplast) | excellent |
| Sample 2 | SBS mod. bit. (Nord Bitumi) | excellent |
| Sample 2 | SBS mod. bit. (Tamko) | excellent |
| Sample 1/5% ZnO | Brai | good |

The tiecoats of this invention function without deleterious effect on the important blistering resistance of the mastic coating system.

EXAMPLE 8. USE OF A CONSOLIDATING TIECOAT

A forty year old cement asbestos corrugated sheet roof was examined and found to be structurally sound; however, prolonged weathering revealed surface degradation and friable asbestos fibers. A consolidating tiecoat was prepared by adding to 25 lbs. latex polymer 2, 25 lbs. water, 0.011 lbs. defoamer (Nopco ® NZX), and 0.011 lbs. fluorocarbon flow aid (Fluorad ® FC-120(25%)). The consolidating tiecoat was airless spray applied at approximately 50 square feet/gallon using a #23th Graco spray tip. The coating was observed to penetrate into the substrate and dried rapidly to a smooth uniform surface encapsulating surface irregularities. The coating was dry to touch in about 15 minutes; operatives walked on the tiecoat and applied a topcoat of mastic coating 1 (modified by an equal weight substitution of Camelite ® calcium carbonate for Duramite ® calcium carbonate) after 1 hour of dry time. The mastic coating was airless spray applied at approximately 40 sq. ft./gal. using a Graco #35 spray tip. The appearance of the mastic system was excellent. On an adjacent area of the same roof the same substrate was coated as the same modified mastic coating without first applying a tiecoat. Extensive blistering or entrapped air was evident on the surface of the mastic coating, presumably resulting from the porous unconsolidated nature of the substrate.

What is claimed is:

1. A method for improving the quality of a mastic coating system comprising:
    (a) forming a tiecoat composition comprising at least one water-insoluble latex polymer and at least one detackifying agent, wherein said latex polymer has a glass transition temperature from about −20° C. to about 0° C.;
    (b) applying said tiecoat composition to a substrate surface; and
    (c) applying a mastic coating to said tiecoat composition coated onto said surface.

2. The method of claim 1 wherein said latex polymer has a glass transition temperature from about −20° C. to about −10° C.

3. The method of claim 1 wherein said latex polymer is prepared from a monomer mixture comprising an ethylenically unsaturated acid-containing monomer at a level from about 0.5% to about 5.0% based on the weight of said monomer mixture.

4. The method of claim 3 wherein said acid-containing monomer level is from about 0.5% to about 1.0%, based on the weight of said monomer mixture.

5. The method of claim 1 wherein said detackifying agent is selected from the group consisting of particulate inorganic pigments, particulate polymeric pigments, and hard alkali-soluble polymeric additives.

6. The method of claim 1 wherein said detackifying agent is zinc oxide.

7. The method of claim 1 wherein said detackifying agent is an emulsion-polymerization prepared void-comprising pigment particle.

8. The method of claim 1 wherein said detackifying agent is the ammonium salt of maleamic acid/diisobutylene copolymer.

9. The method of claim 1 wherein said substrate surface is an asphaltic or bituminous substrate surface.

10. The method of claim 1 wherein said substrate surface is a cement/asbestos substrate surface.

* * * * *